(No Model.)
J. H. LITTLE.
MEANS FOR MANUFACTURING HOMINY FLAKES OR CORN FLAKES.
No. 446,759. Patented Feb. 17, 1891.
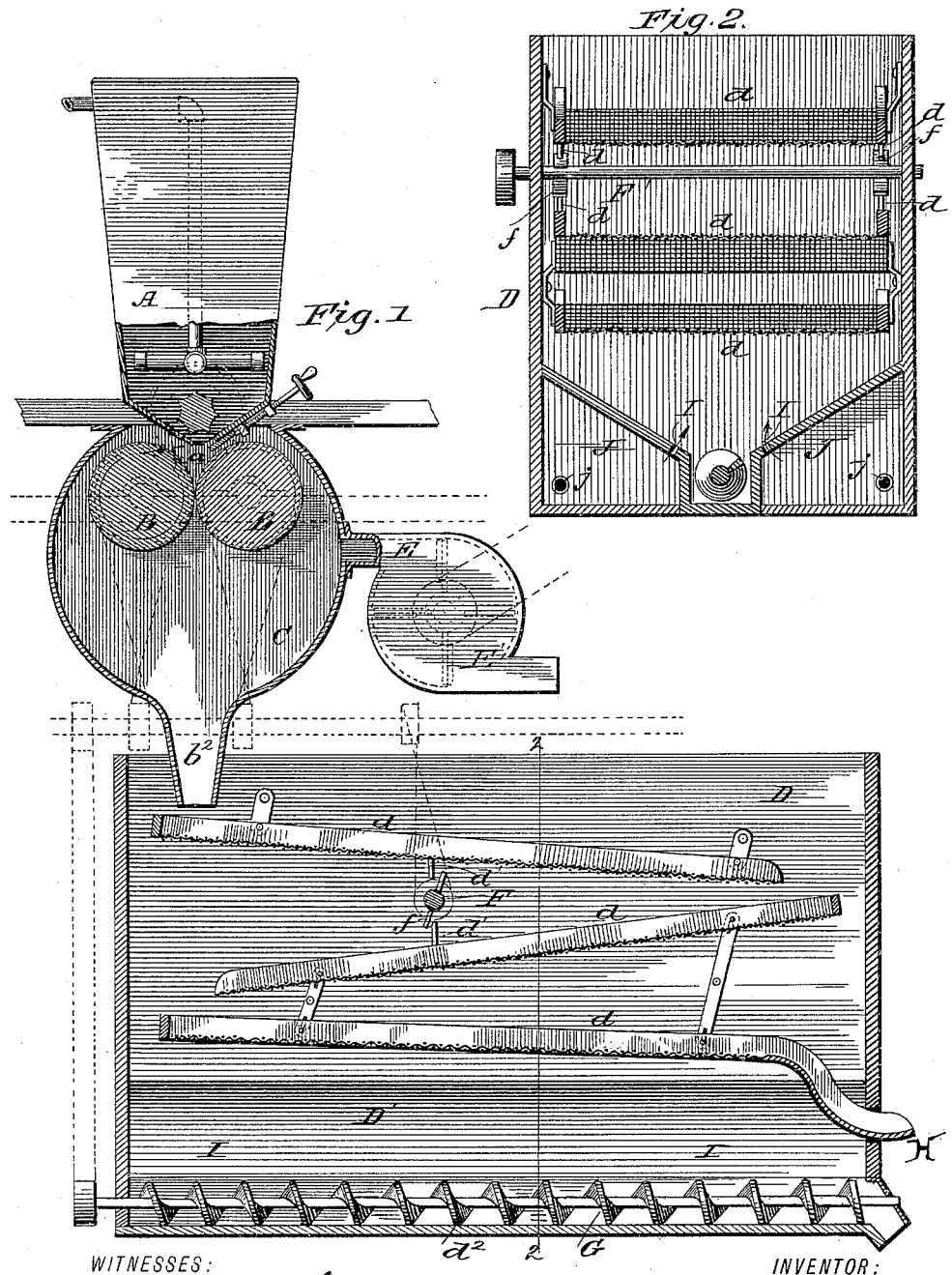
WITNESSES:
Fred. G. Dieterich
H. J. Robinson
INVENTOR:
Jeremiah H. Little
BY Munn & Co.
ATTORNEYS

UNITED STATES PATENT OFFICE.

JEREMIAH H. LITTLE, OF YELLOW SPRINGS, OHIO.

MEANS FOR MANUFACTURING HOMINY-FLAKES OR CORN-FLAKES.

SPECIFICATION forming part of Letters Patent No. 446,759, dated February 17, 1891.

Application filed September 27, 1890. Serial No. 366,402. (No model.)

*To all whom it may concern:*

Be it known that I, JEREMIAH H. LITTLE, residing at Yellow Springs, in the county of Greene and State of Ohio, have invented certain new and useful Means for Manufacturing Hominy-Flakes or Corn-Flakes, of which the following is a specification.

My invention has for its object to provide means for making an edible product from Indian corn or maize, commonly called "hominy-flakes," which can be cooked in much less time than hominy and yet preserve its flavor, form, and consistency; and it more especially relates to the product referred to in a patent granted to James A. Currie, No. 427,159, dated May 6, 1890, said means being improvements on the devices illustrated in such patent.

To this end my invention consists in the peculiar combination and novel arrangement of parts, all of which will hereinafter be fully described in the annexed specification, and particularly pointed out in the claims, reference being had to the accompanying drawings, in which—

Figure 1 is a vertical section of my improved devices; and Fig. 2 is a cross-section of the drying-box, taken on the line 2 2, Fig. 1.

In the accompanying drawings, A indicates a cooking-vessel, which may be of any suitable construction, preferably of the form shown in the patent above referred to. Below the discharge end $a$ of said vessel are disposed a pair of horizontally-arranged cold rollers B B, driven toward each other by suitable belting, as shown in dotted lines in Fig. 1 of the drawings.

C indicates a casing, which surrounds the rollers B B and the discharge end of the cooking-vessel A, the end of such casing being preferably connected with the said vessel A, as shown, while the lower end of the casing is contracted and formed into a discharge-spout $b^2$, which opens into the upper end of a drying-box D, hereinafter referred to.

In the practical application of my invention the dry corn, after it has been first subjected to a process which removes the hulls and the germs, is placed in the cooking-vessel and steamed until it is soft, but not enough to destroy the individuality of the grain, after which the cooked corn is passed between the equally-speeded rollers B B, which roll the corn into thick broad flakes, which operation serves to condense the particles and disintegrates them and allows the greater portion of the aqueous vapor to exude therefrom.

In the devices disclosed in the patent above referred to no means were provided for separating the pressed corn from the great bulk of moisture immediately after said corn fell from the rolls.

By reference to Fig. 1 of the drawings it will be observed that with the casing C, I connect a suction-pipe E at a point below the rolls, which is connected with a suitably-arranged suction-fan E', as shown.

By providing a casing about the rolls and connecting with it a suction device, as stated, the cooked hot particles as they pass between the rolls B are pressed into large flat flakes. The moisture as it is separated from the flakes by the rolls is formed into an aqueous vapor, which is drawn off by the suction-fan into a suitably-arranged discharge, in which it again condenses and runs off in a constant stream of water, thereby effectually separating the greater amount of the moisture from the corn-flakes just as they are pressed out, thus partially drying them and rendering their final drying the more speedy and effective. As the partially-dried flakes drop from the rollers they pass out through the spout $b^2$ into a drying box or chamber D, provided with a series of shaking-screens $d$, arranged as shown, which may be vibrated in any well-known manner—*e. g.*, by means of the shaft F, formed with knocker-fingers $f\,f$, which engage projections $d'$ or the screens in a manner clearly understood by reference to the drawings. The lower portion D' of the chamber D is formed trough-like in cross-section, in the bottom of which is formed a longitudinal channel $d^2$, in which operates a feed-screw G, for a purpose presently explained. The lower screen is formed with a discharge-spout H, which extends to without the chamber and serves to discharge the dried corn-flakes into any suitable receptacle.

In the lower longitudinal edges of the part D' of the chamber a series of apertures I are provided, through which air (preferably warm air) is forced into the chamber, said air serving to gently blow through the screens and flakes and thoroughly dry them before they are discharged through the spout H. Air-spaces J are formed under the inclined bottoms of the trough D', with which are connected air-inlet pipes $j$, which serve to lead the air from any desired source to the drying-chamber. By the aforesaid arrangement of the parts it will be observed that as the greater amount of moisture is separated from the corn-flakes before they fall into the drying-chamber such flakes will the more quickly and effectually be dried as they pass over the several screens, a very light blast of air serving to completely dry such flakes before they pass out of the drying-chamber. The meal or very fine particles which fall through the screens into the trough $d^2$ are drawn off by the feed-screw G.

While I have shown ordinary shaking-screens for leading the flakes through the drying-chamber, it is obvious that endless belts formed of textile fabric of coarse mesh may be employed, as the air will percolate through the same and come into contact with the flakes. I furthermore desire it to be understood that I do not limit myself to the exact construction and arrangement of the several parts shown, as these may be varied without departing from the broad idea of my invention.

Having thus described my invention, what I claim as new, and desire to secure by Letters Patent, is—

1. In an apparatus for the manufacture of hominy-flakes, the combination, of the cooking-vessel A, formed with a discharge-outlet, the crushing-rolls B B, located to receive the cooked particles from the vessel A, a casing surrounding such rolls, formed with a discharge-outlet, and a suction device connected with such casing, arranged to draw off the vapor as it exudes from the particles when crushed by the rolls B, substantially as and for the purpose described.

2. The combination of the cooking-vessel A, the crushing-rolls B, the casing C, the drying-chamber D, provided with a series of shaking-screens and a trough-like bottom, and means for forcing a hot-air blast upward into such chamber, substantially as and for the purpose described.

3. The combination, with the cooking-vessel A, the drying-chamber D, located below the same, the crushing-rolls, and the casing C, disposed between said chamber and vessel, of a suction device arranged to draw off the vaporized moisture as the same exudes from the crushed particles and before they enter the drying-chamber D, all arranged substantially as and for the purpose described.

JEREMIAH H. LITTLE.

Witnesses:
CHAS. L. SPENCER,
GEORGE LITTLE.